United States Patent

Brodell et al.

[11] Patent Number: 4,653,267
[45] Date of Patent: Mar. 31, 1987

[54] THRUST BALANCING AND COOLING SYSTEM

[75] Inventors: Robert F. Brodell, Marlborough; Vincent P. Laurello, Guilford, both of Conn.

[73] Assignee: United Technologies Corporation, Hartford, Conn.

[21] Appl. No.: 727,190

[22] Filed: Apr. 26, 1985

Related U.S. Application Data

[63] Continuation of Ser. No. 499,630, May 31, 1983, abandoned.

[51] Int. Cl.[4] ............................................. F02G 3/00
[52] U.S. Cl. .................................. 60/39.02; 60/39.07; 60/39.83
[58] Field of Search ................. 60/39.08, 39.83, 39.07, 60/39.75, 39.161, 39.02; 184/6.11; 384/320, 139, 142, 143, 130; 415/110, 111, 112, 170 R, 175, 176; 308/187, 187.1, 187.2

[56] References Cited

U.S. PATENT DOCUMENTS

| | | | |
|---|---|---|---|
| 2,951,337 | 9/1960 | Atkinson et al. | 184/6.11 X |
| 3,362,160 | 1/1968 | Bourgeois | 60/39.75 |
| 3,382,670 | 5/1968 | Venable | 415/176 X |
| 3,433,020 | 3/1969 | Earle, Jr. et al. | 60/39.08 X |
| 3,452,542 | 7/1969 | Saferstein et al. | 60/39.75 X |
| 3,527,054 | 9/1970 | Hemsworth | 415/111 |
| 4,099,727 | 7/1978 | Weiler | 415/112 X |
| 4,156,342 | 5/1979 | Korta et al. | 415/112 X |
| 4,217,755 | 8/1980 | Williams | 60/39.75 |
| 4,296,599 | 10/1981 | Adamson | 60/39.75 X |
| 4,433,539 | 2/1984 | Norris et al. | 60/39.08 |
| 4,466,239 | 8/1984 | Napoli et al. | 60/39.75 X |

Primary Examiner—Carlton R. Croyle
Assistant Examiner—Donald E. Stout
Attorney, Agent, or Firm—Norman Friedland

[57] ABSTRACT

Thrust balance in a gas turbine engine of the thrust balance seal is modulated by judiciously locating a seal between the inner diffuser case and the rear of the high compressor rotor shaft and bleeding air out of the cavity between both seals. The bled air is utilized to cool a portion of the high pressure turbine rotor. Cool air bled from mid-stage compressor is fed downstream of the second seal to cool the bearing compartment.

2 Claims, 1 Drawing Figure

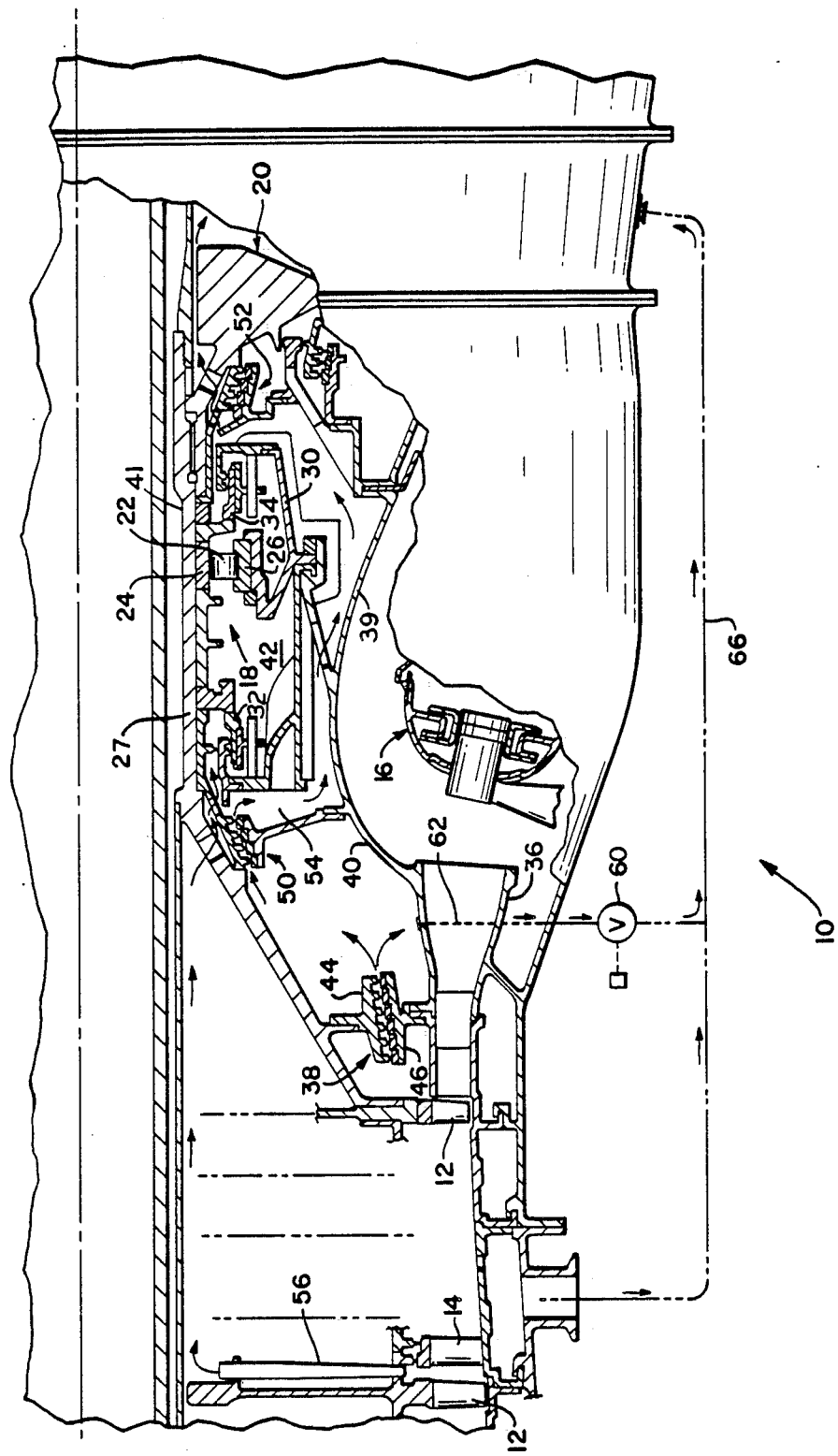

THRUST BALANCING AND COOLING SYSTEM

DESCRIPTION

This application is a continuation of Ser. No. 499,630, filed 5/3/83, now abandoned.

TECHNICAL FIELD

This invention relates to gas turbine type power plants for powering aircraft and particularly to thrust balancing of the thrust loads on the internal components of the engine and concomitantly cooling of the bearing compartment and turbine.

BACKGROUND ART

In current gas turbine engines of the twin spool type the leakage of high pressure compressor discharge air through the labyrinth seal carried between the high pressure compressor rear rotor shaft and diffuser case typically establishes the thrust loads on the component parts such as the thrust bearing. This air is also used downstream in the engine for cooling purposes, particularly, the bearing compartment and the high pressure turbine. In these heretofore designed engine models, the thrust balance is dictated by the diameter of this seal and/or pressures and once the balance is set for a given operating point, it cannot be varied for any other. Hence, the balance point is selected for a predetermined mode of engine operation, and it is a compromised value, as it will vary with all other operating modes. Hence, on many engines it is difficult, if not impossible to provide the desired thrust load at both the sea level take-off condition and also, the cruise condition.

Inasmuch as the temperature surrounding the bearing compartment is dictated by this discharge air, on certain engine designs, particularly those comtemplated for the future, this temperature is unacceptably high. Obviously, since the temperature of this air is higher than the temperature of the air of heretofore known engines, its use for cooling of the high pressure turbine is less than desirable, and when such is used, considerably more flow is required, resulting in a higher thrust specific fuel consumption.

We have found that we can achieve a more effective thrust balance system than the heretofore engines by an addition to the thrust balance seal judiciously locating seals fore and aft of the bearing compartment so as to isolate this area and independently control the atmosphere surrounding the bearing compartment. In accordance with this invention, a controllable valve or orifice adapted to bleed compressor discharge air from the chamber immediately upstream of the fore seal mentioned above serves to control the pressure drop across thrust balance seal so as to effectuate a desired thrust load during a given operating condition of the engine.

The air bled from this chamber, ahead of the fore seal being at a compatible temperature and pressure is routed externally to the high pressure turbine static structure for cooling purposes.

Cooler air, air that is cooler than the environment surrounding the bearing compartment, is fed into this environment between the fore and aft seals, is bled from the mid-stage compressor either through an anti-vortex tube directing the compressor bleed air radially inward to the engine's shaft where it flows axially to the environment surrounding the mid-frame bearing compartment, or externally from the mid high pressure compressor case thru the diffuser case to the bearing compartment, this air then is used to supply cooling to portions of the high pressure turbine rotor.

By virtue of this invention we are able to provide a cooler atmosphere surrounding this bearing compartment and supply cooler air to the high pressure turbine rotor.

The external valve controlling the leakage flow of the thrust balance seal upstream of the fore seal, serves to modulate the thrust balance.

We have also found, with the additional seals that in engines that employ turbine on board injectors (TOBI) we can increase the TOBI discharge pressure with a minimal impact on thrust balance and leakage.

DISCLOSURE OF INVENTION

An object of this invention is to provide an improved thrust balance system for a gas turbine engine. A feature of this invention is the judicious location of seals fore and aft of the bearing compartment that provides a controlled atmosphere surrounding the bearing compartment. This compartment is fed with cooler mid-compressor bleed air. Another feature of this invention is utilizing an external controllable valve or orifice that bleeds compressor discharge leakage air from the thrust balance seal and utilizes this air for cooling of the high pressure turbine, during certain engine operating modes.

Other features and advantages will be apparent from the specification and claims and from the accompanying drawings which illustrate an embodiment of the invention.

BRIEF DESCRIPTION OF DRAWING

The sole FIGURE is a fragmentary view of a turbine type power plant, partly in section and partly in schematic illustrating the details of this invention.

BEST MODE FOR CARRYING OUT THE INVENTION

For the sake of simplicity and convenience only that portion of the gas turbine engine that is necessary for an understanding of this invention is disclosed. For further details of a suitable engine reference should be made to the JT-9D engine model manufactured by Pratt & Whitney Aircraft, a division of United Technologies Corporation, the assignee of this patent application. Suffice it to say that the engine of the preferred embodiment is a twin spool axial compressor flow type. In this embodiment only the high pressure spool or gas generator, i.e. a portion of the high pressure compressor, a portion of the high pressure turbine, and the burner section and the mid-bearing is shown. However, it is to be understood as one skilled in the art will recognize that this invention has utility in other types of engines, particularly where it is desirable to modulate the thrust balance and/or cool the bearing compartment.

Referring now to the sole FIGURE, the engine generally indicated by reference numeral 10 comprises a compressor section having a plurality of axial compressor stages, consisting of compressor blades 12 and stator 14, a burner 16, bearing 18, and high pressure turbine 20. Bearing 18, consisting of rollers 22, inner race 24, and outer race 26 supports shaft 27 that carries compressors 12 and turbines 20 in a conventional manner. The bearing is housed in case 30, that encapsulates the bearing and defines the bearing compartment. The ends of the compartment are sealed by carbon seals 32 and 34 which serves to prevent the oil used for lubrication and cooling from escaping.

A portion of the air discharging from the compressor is diffused through the diffuser 36 which feeds the burner 16 and a portion is routed to the thrust balancing seal 38 disposed between the high pressure compressor rear shaft 41 and the diffuser case 40. This seal is a well known labyrinth type where the toothed portion 44 is connected to the rotating shaft 26 that bears against the fixed land 46.

According to this invention an additional seal 50, preferably labyrinth similar to the labyrinth used for thrust balance is disposed between the thrust balance seal 38 and bearing compartment 42. An additional seal 52 is disposed between the high pressure turbine 20 and bearing compartment 42 which serves to isolate the cavity 54 between these two seals and the inner burner case 39.

As is apparent from the foregoing the cavity between the seals 50 and 52 provide an isolated controllable environment surrounding the bearing compartment 42. The atmosphere which heretofore is conventionally subjected to compressor discharge pressure, in accordance with this invention is subjected to the cooler midstage compressor air. As shown, this air is fed from the mid-stage compressor through the anti-vortex tube 56, which directs compressor air from this stage radially inwardly toward the engine's shaft where it flows axially to the cavity 54 to surround the bearing compartment. Alternatively, this air can be bled from the compressor outer wall and admitted to cavity 54 through external plumbing (not shown).

To modulate the thrust balance during certain engine operating conditions, say take-off where the thrust and hence flow through the engine is at its highest value, the valve 60 located externally of the engine case, is positioned from a closed to opened condition to bleed thrust seal 38 leakage air through line 62 and hence change the pressure drop across the seal to effectuate a change in the pressure loading on the component parts. This serves to maintain the desired thrust load during this engine operating mode. Upon a reduction of engine power, say in the cruise condition, the valve 60 is actuated by the actuator schematically shown to the closed position.

Since the air is at a cooler temperature than the turbine environment and is at a pressure compatible with the pressure at the turbine, valve 60 serves to direct the thrust seal leakage flow to the turbine air cooling flow through line 66. Hence, the leakage flow mixes with the cooling air to augment the cooling capacity during the operating regime when valve 60 is opened.

It should be understood that the invention is not limited to the particular embodiments shown and described herein, but that various changes and modifications may be made without departing from the spirit and scope of this novel concept as defined by the following claims.

We claim:

1. The method of balancing the thrust loads imposed on components in a gas turbine engine of the type that includes a compressor and turbine which gas turbine engine operates over a given operating envelope including low thrust to high thrust producing capacity including the steps of:

enclosing a chamber with components having pressure exposing surfaces within the engine between the compressor and turbine and including sealing structure attached to said components such that the sealing structure includes axially disposed seals which seals have a known leakage characteristic, supplying air from the compressor to leak into the enclosed chamber through at least one of the seals' structure, and the pressure of the air varying in a relationship in the operating envelope, bleeding the air from the enclosed chamber in accordance with a predetermined schedule according to the operating envelope of the engine, so that the pressure acting on pressure exposed surfaces of the components balances the thrust loads generated by the compressor and turbine of the engine while operating over its operating envelope.

2. The method as in claim 1 wherein the air bled from the enclosed chamber is fed to the component parts of the turbine for the cooling thereof.

* * * * *